(12) United States Patent
Schlansker et al.

(10) Patent No.: US 8,125,991 B1
(45) Date of Patent: Feb. 28, 2012

(54) NETWORK SWITCH USING MANAGED ADDRESSES FOR FAST ROUTE LOOKUP

(75) Inventors: Michael Schlansker, Los Altos, CA (US); Nathan Lorenzo Binkert, Redwood City, CA (US); Jayaram Mudigonda, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 735 days.

(21) Appl. No.: 11/831,890

(22) Filed: Jul. 31, 2007

(51) Int. Cl.
*H04L 12/28* (2006.01)
*H04Q 7/00* (2006.01)

(52) U.S. Cl. .................................. 370/392; 370/395.31

(58) Field of Classification Search .................. None
See application file for complete search history.

(56) References Cited

U.S. PATENT DOCUMENTS

| | | | |
|---|---|---|---|
| 5,920,886 A | 7/1999 | Feldmeier | |
| 6,085,238 A * | 7/2000 | Yuasa et al. | 709/223 |
| 6,141,738 A | 10/2000 | Munter et al. | |
| 6,807,179 B1 * | 10/2004 | Kanuri et al. | 370/395.31 |
| 6,888,838 B1 | 5/2005 | Ji et al. | |
| 6,948,003 B1 | 9/2005 | Newman et al. | |
| 6,993,034 B1 | 1/2006 | Block et al. | |
| 7,496,782 B1 * | 2/2009 | Kownacki | 714/4 |
| 7,525,968 B1 * | 4/2009 | Dropps et al. | 370/392 |
| 7,539,185 B2 * | 5/2009 | Shankar et al. | 370/389 |
| 2003/0046496 A1 * | 3/2003 | Mitchem | 711/147 |
| 2003/0053448 A1 * | 3/2003 | Craig et al. | 370/353 |
| 2005/0213560 A1 * | 9/2005 | Duvvury | 370/351 |
| 2006/0034292 A1 * | 2/2006 | Wakayama et al. | 370/395.5 |
| 2006/0039378 A1 * | 2/2006 | Medina et al. | 370/392 |
| 2006/0195848 A1 * | 8/2006 | Arndt et al. | 718/104 |
| 2007/0067481 A1 * | 3/2007 | Sharma et al. | 709/231 |

* cited by examiner

*Primary Examiner* — Hassan Phillips
*Assistant Examiner* — Eunsook Choi

(57) ABSTRACT

Described is a switch architecture that combines address management with simplified hardware to implement fast route lookup within network switches such as Ethernet switches. A managed address includes a cluster ID which is shared by all endpoints in a cluster, and a member ID which is unique for each node in the cluster. The switch extracts the cluster ID from a target address for a packet and compares it against at least one cluster ID stored in a cluster identification memory. Responsive to a match, the switch generates a port identification for the packet using a fast lookup table. Responsive to no match, the target address is considered an unmanaged address. In one implementation, a slow lookup table can be used to generate a port identification for the unmanaged address.

19 Claims, 3 Drawing Sheets

NETWORK SWITCH USING MANAGED ADDRESSES FOR FAST ROUTE LOOKUP

TECHNICAL FIELD

The present invention relates generally to a network switch and more particularly to route lookup by a network switch.

BACKGROUND ART

Data centers incorporate switched fabrics containing switches that perform route lookup operations needed to determine where to send a packet having a given destination address. A destination address carried within each packet uniquely identifies the endpoint to which the packet should be sent. An example of such switches are Ethernet switches.

Each Ethernet switch has a number of bidirectional Ethernet ports. When a switch receives a packet it uses the destination address to determine the desired output port and then sends that packet through the output port to the next Ethernet switch or endpoint device in the fabric. The choice of output port at each hop determines a route through the Ethernet fabric. In order to maintain correct communications, the route for each address must finally reach the destination Ethernet endpoint that is indicated by the target address from any point in the fabric.

Existing Ethernet switches process arbitrarily chosen Ethernet addresses. When a packet arrvies at a switch, the switch must use the packet's destination Ethernet address to quickly determine a route or destination port to which that packet should be sent. Forwarding tables are used to define a route for each Ethernet endpoint within a cluster. When Ethernet addresses are arbitrarily selected, and fast lookup is required, expensive associative lookup hardware is commonly used to quickly determine the route for the packet. Some high performance solutions rely primarily on Content Addressable Memories (CAMs) to quickly identify a packet route for arbitrarily assigned Ethernet addresses. Fast content addressable memories are expensive to build in hardware.

Software-based lookup and look-up techniques implemented in inexpensive hardware are much cheaper but introduce significant routing latency.

What is desired is a solution which provides low latency or fast route lookup while leveraging lower cost conventional memory types. In the case of Ethernet switches, it is desirable that the solution also conforms to Ethernet standards.

SUMMARY

The present invention provides one or more embodiments of a switch architecture that combines address management with simplified hardware to implement fast route lookup within network switches. In one embodiment, the switch is an Ethernet switch. Compatibility allows the improved switch to be used with standard Ethernet hardware and software components. Fast and inexpensive route lookup allows the construction of cost-effective data centers and compute clusters with very low end-to-end latency.

Local area networks are connected to remote devices through a global network of routers. A compute cluster includes a number of nodes (e.g., computing systems) where each node is attached to a network endpoint having a network address that is unique within the cluster.

In the illustrative context of an Ethernet cluster, the Ethernet addresses are managed across the cluster. Address management separates the address into cluster identifier (cluster ID) and member identifier (member ID) components. Ethernet address assignments are chosen so all endpoints in a cluster share a common value for the cluster ID component of the address. The value of the member ID is unique for each node in the cluster. The member ID is used to search a fast lookup table implemented in conventional memory instead of associative memory.

The present invention provides a method for fast route lookup based on managed addresses in accordance with an embodiment of the present invention. The method comprises extracting a cluster identification and a member identification from a target address of a packet and comparing the extracted cluster identification with at least a first cluster identification stored in a cluster identification memory. Responsive to a match in cluster identifications, looking up the target address including the cluster identification and the member identification in a fast lookup table for identifying a port for the packet. Additionally, the method can comprise, responsive to no match in cluster identifications, determining a port for the arriving packet using a slow lookup table.

The present invention provides a switch for fast route lookup based on managed addresses in accordance with an embodiment of the present invention. The switch comprises a cluster identification memory and control logic for extracting a cluster identification and a member identification from a target address of a packet and comparing the extracted cluster identification with at least a first cluster identification stored in a cluster identification memory. The switch further comprises a fast lookup table coupled to the control logic and the cluster identification memory. Responsive to a match in cluster identifications, the control logic generates a port identification by looking up the target address including the cluster identification and the member identification in the fast lookup table. In another embodiment, the switch further comprises a slow lookup table. Responsive to no match in cluster identifications, the control logic determines a port identification for the arriving packet using the slow lookup table.

Certain embodiments of the invention have other aspects in addition to or in place of those mentioned or obvious from the above. The aspects will become apparent to those skilled in the art from a reading of the following detailed description when taken with reference to the accompanying drawings.

DETAILED DESCRIPTION

Figure 1:
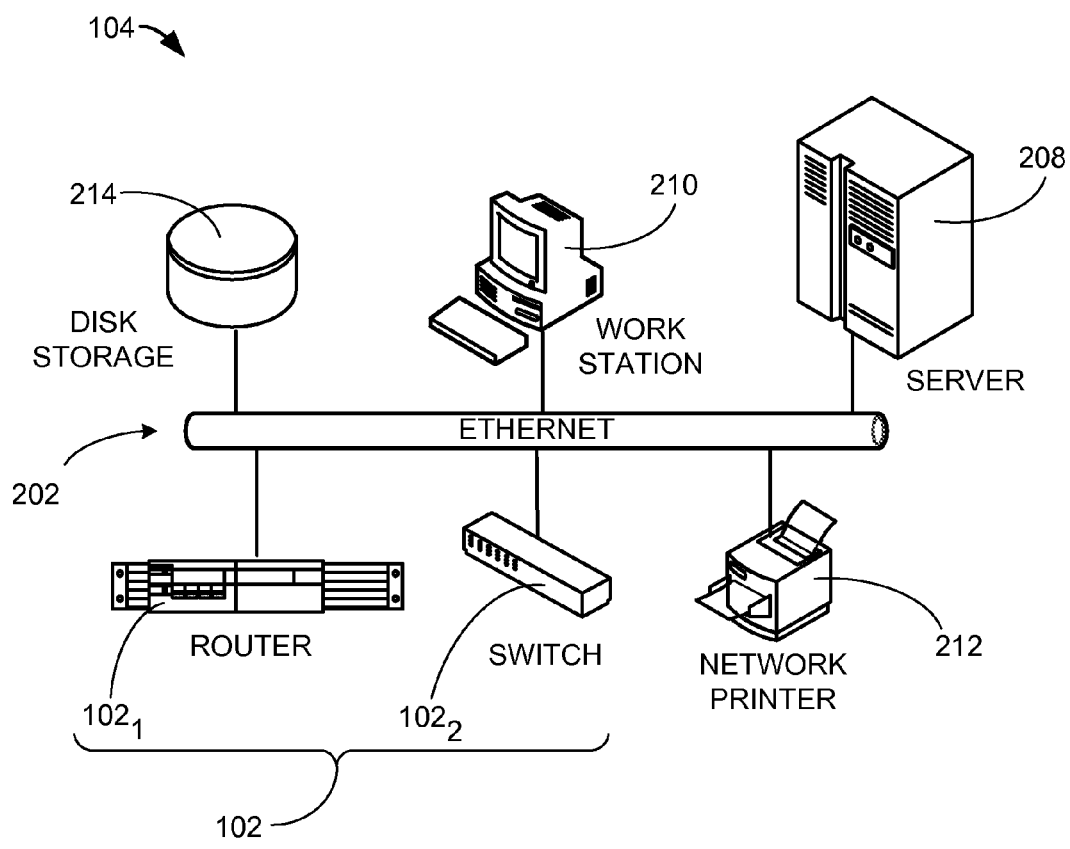
FIG. 1 is a block diagram view of a network cluster in which one or more embodiments of the present invention can operate.

In the following description, numerous specific details are given to provide a thorough understanding of the invention. However, it will be apparent that the invention may be practiced without these specific details. The drawings showing embodiments of the system are semi-diagrammatic and not to scale and, particularly, some of the dimensions are for the clarity of presentation and are shown greatly exaggerated in the drawing FIGs.

In addition, where multiple embodiments are disclosed and described having some features in common, for clarity and ease of illustration, description, and comprehension thereof, similar and like features one to another will ordinarily be described with like reference numerals. The embodiments have been numbered first embodiment, second embodiment, etc. as a matter of descriptive convenience and are not intended to have any other significance or provide limitations for the present invention.

FIG. 1 is a block diagram view of a network cluster in which one or more embodiments of the present invention can operate. The cluster 104 depicts a portion of a local area network (LAN) 202, an Ethernet LAN in this embodiment, including a number of nodes associated with network endpoints.

Examples of nodes include a couple of examples of network switches 102, a network router $102_1$ and a network switch $102_2$. Other illustrative examples of the nodes include a server 208, a workstation 210, a network printer 212, and a disk storage 214. The cluster 104 may also include other systems (not shown) as nodes as well. The cluster 104 may be collocated in the same physical location, such as a data center room, or it may be distributed into different locations, such as distributed within a building and not in the same room.

Many in-data-center communications benefit from low latency when traversing the local area network. A data center may include a compute cluster consisting of a number of nodes or computing systems. Compute clusters can be used to accelerate parallel applications using message passing or other communications techniques. The performance of applications running on compute clusters is often very sensitive to the within-cluster communication latency.

Figure 2:
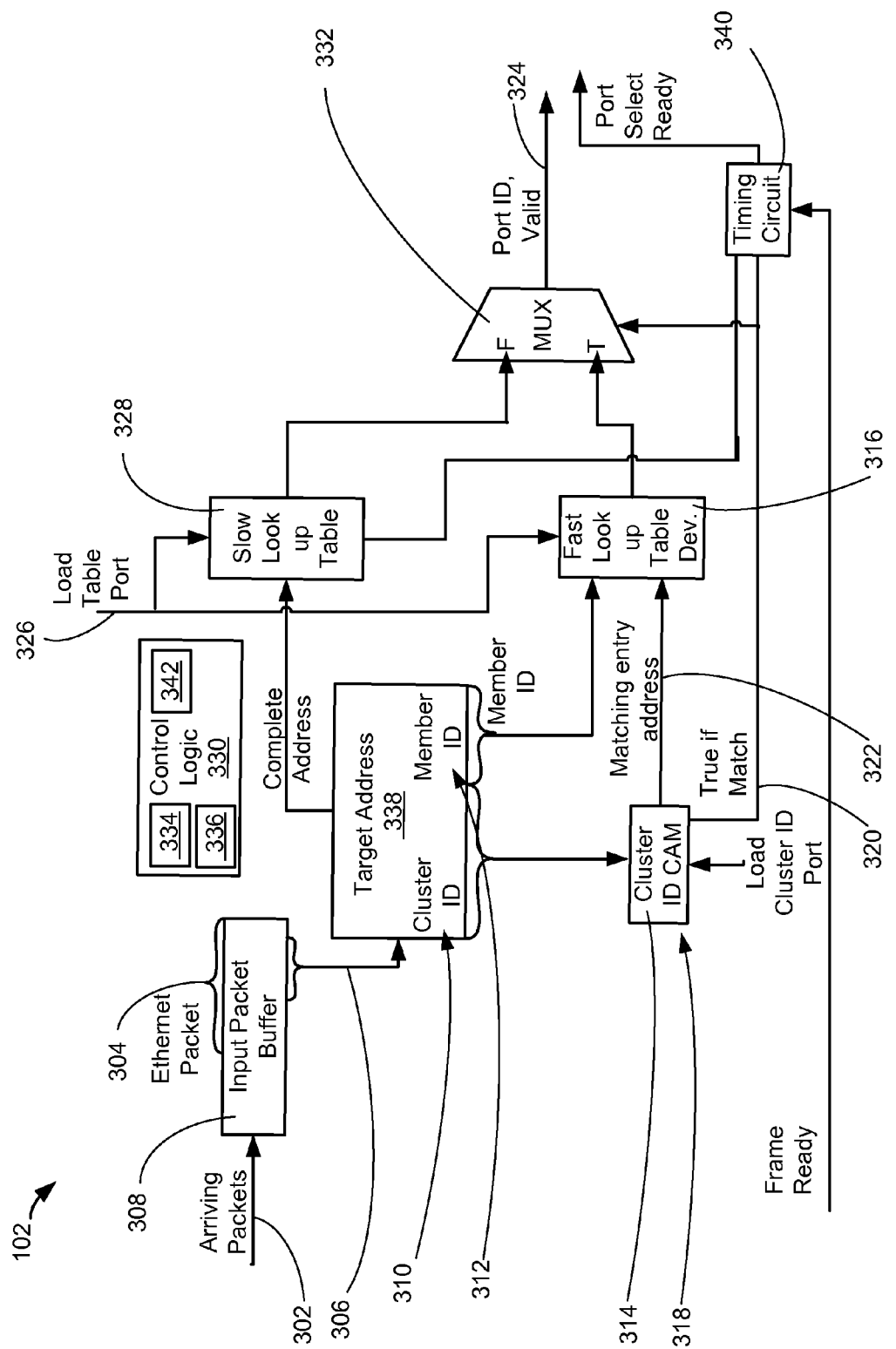
FIG. 2 is a block diagram view of a switch architecture for fast route lookup in accordance with an embodiment of the present invention.

FIG. 2 is a block diagram view of a switch architecture for fast route lookup in accordance with an embodiment of the present invention. The switch 102 receives an arriving packet 302 and preferably holds an information packet 304, such as an Ethernet packet, having a target address 306, from the arriving packet 302 into an input packet buffer 308. The network switch 102 performs route lookup operations to determine where to send the information packet 304 having the target address 306, such as an Ethernet destination address.

The target address 306 is preferably carried within each of the arriving packets 302 identifying an endpoint, such as an Ethernet endpoint, to which the information packet 304 should be sent. Each of the network switches 102 preferably has a number of bidirectional ports, such as bidirectional Ethernet ports. Each of the network switches 102 preferably determines an output port from the bidirectional ports based on the target address 306 and sends the information packet 304 through the output port to the next selection of a network switch 102 or to an endpoint of the switched fabric, such as an Ethernet fabric.

The selection of the output port at each hop determines a route through the fabric. For correct communications, the route for each target address 306 preferably reaches the destination or the endpoint that is indicated by the target address 306 from any point in the fabric or the cluster 104. Forwarding tables preferably provide a route for each of the endpoint within the cluster 104.

In one aspect of the present invention is the addresses within a cluster may be selected to simplify and speedup the address lookup in the network switches. The term "managed addresses" as used herein refers to these simplified addresses.

The managed addresses can be set by an administrator of the local area network 106 or the cluster 104 and preferably coordinate communications within the cluster 104. The managed addresses are preferably programmed into the endpoints and network switches, such as the network switches 102 coupled to the endpoints that have a programmable address assignment. In one embodiment, the network switches 102 support unmanaged as well as managed addresses. An unmanaged address may be used to address any system (not shown) having a fixed address that cannot be reprogrammed.

In another aspect of the present invention is to provide efficient, high performance, low cost, and low power consumption forwarding of information packets containing managed destination addresses but can also forward arbitrary addresses. In an Ethernet cluster, the network switches 102 embodying the present invention are fully Ethernet compatible.

As more description to this example, the network switches 102 within the cluster 104 provide a high performance network endpoint with programmable address, such as programmable Ethernet address. The managed addresses, such as the programmable Ethernet addresses, are managed across the cluster 104.

Address management preferably proceeds as follows. One of the arriving packets 302 having the information packet 304 is received into the input packet buffer 308 within one of the network switches 102. The target address 306 of the information packet 304 is preferably extracted from the input packet buffer 308 and preferably stored in a target address logic 338. The target address 306 is preferably separated or parsed into a cluster identification 310 and a member identification 312.

The address assignments, such as Ethernet address, are preferably chosen so the endpoints in the cluster 104, such as a cluster, share a common value for the cluster identification 310 of managed addresses 314. The value for the member identification 312 is preferably unique for each node in the cluster 104.

In an example of a cluster of 4096 nodes, 12 bits of the member identification 312 distinguish the 4096 nodes. The member identification 312 is used to search a fast lookup table device 316, such as a random access memory (RAM) containing the lookup table, that is implemented using conventional memory, such as static random access memory (SRAM) or dynamic random access memory (DRAM), instead of associative memory. Conventional memories are highly optimized hardware structures that offer a combination of both small circuit area and high speed of access in many implementation technologies.

The cluster identification 310 is preferably compared to one or more values of the managed addresses 314 held in a content addressable memory 318 (CAM), such as a cluster identification content addressable memory. The content addressable memory 318 allows the network switches 102 to accelerate lookup across one or more separately managed sub-networks or clusters, such as another cluster.

Each sub-network preferably has an arbitrary cluster identification to provide flexible address assignment for the cluster identification 310. The degree of associativity provided by the content addressable memory 318 may be limited to that needed to identify a few sub-networks (e.g. one-way associative for only one cluster).

Each managed sub-network, such as cluster 104, is preferably identified with a unique cluster identification that is stored in a cluster identification memory which in this example is the content addressable memory 318. If the cluster identification 310 of the target address 306 matches any entry in the content addressable memory 318 then the target address 306 is known to be a managed address within one of the sub-networks, such as cluster 104 or a second cluster (not shown). With the cluster identification 310 matching to at least one identification in the content addressable memory 318, a match signal 320 preferably is asserted true and a matching entry address 322 is preferably emitted.

The content addressable memory 318 preferably uses an address location indicator sufficient to identify the location of the match within the CAM hardware. If for example, the content addressable memory 318 has a single entry, then the matching entry address 322 location may be indicated by zero bits wide providing no information. If, for example, the content addressable memory 318 has four entries, then the matching entry address 322 location may be indicated by two bits to identify one of four potentially matching locations. The member identification 312 of the target address 306 is preferably concatenated with the matching entry address 322 from the content addressable memory 318 to form a full address into the fast lookup table device 316.

The fast lookup table device 316 returns a valid bit and a selected port identification 324. If the valid bit is true the returned value of the selected port identification 324 identifies the port for the next hop in the chosen route for the information packet 304. If the valid bit is false, the fast lookup table device 316 maintains no port identification value on the selected port identification 324 for the matching entry address 322 and the member identification 312. The fast lookup table device 316 may preferably be loaded through a load table port 326 to properly route traffic for the managed addresses.

For a non-managed Ethernet address, the target address 306 has the cluster identification 310 that does not match any of the cluster identifications in the content addressable memory 318 used for ranges of the managed addresses. In this case, a slow lookup table 328 processes the unmanaged addresses. The slow lookup table 328 may be implemented in a number ways. As examples, the slow lookup table 328 may be implemented with associative lookup hardware or may use a software lookup approach.

The fast lookup table device 316 and the slow lookup table 328 may be utilized concurrently or sequentially under the control of a control logic 330. For example, in some systems, the vast majority of traffic is sent to the managed addresses within the cluster 104. In such cases, the vast majority of traffic is processed using the fast lookup table device 316 and the slow lookup table 328 may not be utilized or even put in low power mode to conserver power consumption. In other cases, to minimize delay through the slowest path, both the fast lookup table device 316 and the slow lookup table 328 may be exercised. The fast lookup table device 316 and the slow lookup table 328 cooperating with the control logic 330 provide the selected port identification 324 through a multiplexer 332.

The control logic 330 preferably includes other functions for the operation of the network switches 102. For example, the control logic 330 may include a comparison logic 334 for comparing the cluster identification 310 to a range of managed addresses. Also, the control logic 330 may include a decision logic 336 for loading the managed addresses or a portion thereof based on the cluster identification not matching the value or values in the content addressable memory 318 and having the cluster identification in the range of the managed addresses. A timing circuit 340 preferably couples to the content addressable memory 318, the fast lookup table device 316, and the slow lookup table 328 for transmitting the information packet 304 with the selected port identification 324. The control logic 330 also preferably includes a loading logic 342 for loading unmanaged addresses into the slow lookup table 328 and managed addresses into the fast lookup table device 316.

For illustrative purposes, the control logic 330 is shown as a distinct block, although it is understood that the control logic 330 may not be distinct. For example, the control logic 330 or a portion thereof may be included in other functional blocks.

A single cluster identification within the content addressable memory 318 provides fast lookup across nodes within a single cluster, such as the cluster 104, that have the managed addresses that share a common cluster identification. In this case, the cluster identification 310 is extracted from the target address 306 for a destination media access controller (MAC) address compared to the cluster identification address stored within the content addressable memory 318 having a single-word. This comparison preferably verifies that the target address 306 is a managed endpoint address within the cluster 104. Lookup is fast and allows fast routing to all nodes in the cluster 104.

In accordance to this embodiment, a data center manager preferably assigns the managed addresses for nodes within the cluster 104. As nodes are removed or added to the cluster 104, it may be necessary to revise address assignments. This problem can be resolved using dynamic Ethernet address assignment techniques. For example, Dynamic Host Configuration Protocol (DHCP) has been used to automate the assignment of Internet Protocol (IP) addresses to Ethernet devices, such as the network switches 102, when they are attached to a network, such as the local area network 106. In a similar way, Ethernet addresses can be automatically assigned.

An example of the dynamic Ethernet address assignment, the devices, such the network switches 102, respond to two Ethernet addresses. One address is a conventional hardwired address while the other is a managed in-cluster address. The Fast switch lookup is supported only for managed in-cluster addresses. A cluster address server, such as the server 208 of FIG. 2, maintains a database of used and unused managed address assignments for the cluster 104.

When a device, such as one of the network switches 102, is attached and becomes active within the cluster 104 it uses its hardwired address to request a managed address from the cluster server. This request is sent to the cluster address server where the database is consulted and an available managed cluster address is reserved and returned to the newly activated device. The device programs its in-cluster managed address assignment to match the allocated address and then the device can use this address for fast in-cluster communications.

When a device, such as one of the network switches 102, is deactivated or removed from the network, the device's in cluster address assignment is invalidated and a signal is sent to the cluster manager to free the address within the cluster database. The address can now be used by another device, such as one of the network switches 102 that might be used in the cluster 104.

After managed addresses have been properly assigned, communication within the cluster 104 can be performed using the fast lookup table device 316 within the network switches 102. A number of techniques may be used to load the fast lookup table device 316 and the slow lookup table 328 with correct forwarding tables.

Figure 3:
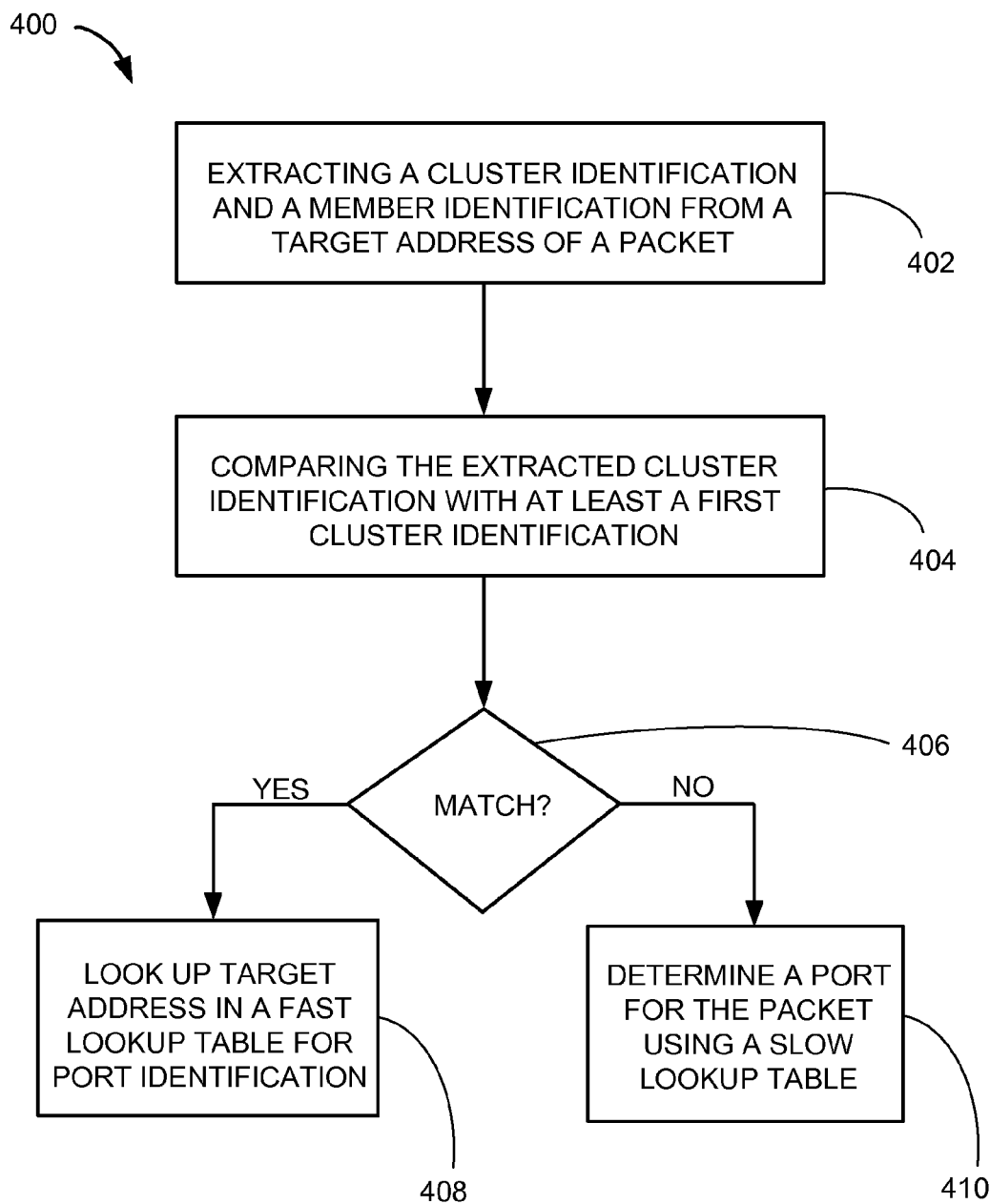
FIG. 3 is a flow chart of a method for fast route lookup in accordance with an embodiment of the present invention.

Referring now to FIG. 3, therein is shown a flow chart of a method 400 for fast route lookup based on managed addresses in accordance with an embodiment of the present invention. The method 400 includes extracting 402 a cluster identification and a member identification from a target address of a packet; comparing 404 the extracted cluster identification with at least a first cluster identification stored in a cluster identification memory; responsive 406 to a match in cluster identifications, looking up 408 the target address including the cluster identification and the member identification in a fast lookup table for identifying a port for the packet; and responsive to no match in cluster identifications, determining 410 a port for the packet using a slow lookup table.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method for fast route lookup based on managed addresses for use by a network switch comprising:
   extracting a cluster identification from a target address of a packet and a member identification from a target address of a packet;
   comparing the extracted cluster identification with at least a first cluster identification stored in a cluster identification memory;
   responsive to a match in cluster identifications, using control logic on the network switch, looking up the target address including the cluster identification and the member identification in a fast lookup table on the network switch for a port identification for the packet; and
   responsive to no match in cluster identifications, using the control logic on the network switch, determining a port identification for the arriving packet using a slow lookup table on the network switch.

2. The method as claimed in claim 1 further comprising assigning managed address for a cluster in accordance with criteria that managed endpoints in a cluster share a common value for the cluster identification component of their addresses and the value of the member identification component is unique for each managed node in the cluster.

3. The method of claim 1 wherein the fast lookup table is implemented in conventional memory on the network switch.

4. The method of claim 1 wherein the slow lookup table is implemented in associative memory on the network switch.

5. The method of claim 1 wherein the network switch is an Ethernet switch.

6. A method for operating a network switch comprising:
   parsing an arriving packet to a cluster identification and a member identification;
   comparing the cluster identification with a plurality of managed addresses loaded from a managed address table on the network switch;
   generating a selected port identification from the managed address table based on the cluster identification matching one of the plurality of managed addresses;
   comparing the cluster identification with a plurality of unmanaged addresses loaded from a unmanaged address table on the network switch in response to the cluster identification not being in a range of managed addresses in the managed address table; and
   generating a selected port identification from the unmanaged address table in response to the cluster identification not matching one of the plurality of managed addresses.

7. The method as claimed in claim 6 wherein parsing the arriving packet to the cluster identification and the member identification includes parsing a target address from the arriving packet with the target address having the cluster identification and the member identification.

8. The method as claimed in claim 6 wherein:
   parsing the arriving packet includes:
      parsing an information packet; and
   further comprising:
      transmitting the information packet with the selected port identification.

9. The method as claimed in claim 6 further comprising operating the network switch in the cluster of the systems.

10. A network switch for fast route lookup based on managed addresses comprising:
    a control logic on the switch for extracting from an arriving packet a cluster identification and a member identification;
    a cluster identification memory on the switch storing at least a first cluster identification and coupled to the control logic for comparing the extracted cluster identification with at least the first cluster identification;
    a fast lookup table device on the switch coupled to the control logic and the cluster identification memory for use by the control logic to look up a target address having a matching cluster identification for port identification; and
    a slow lookup table on the switch coupled to the control logic for use by the control logic in determining a port for the packet when the target address is an unmanaged address.

11. The network switch as claimed in claim 10 wherein the cluster identification memory on the switch is a content addressable memory.

12. The network switch as claimed in claim 10 wherein the network switch is an Ethernet switch.

13. The network switch as claimed in claim 10 wherein the control logic on the switch includes a loading logic for loading an unmanaged address into the slow lookup table on the switch and a loading logic for loading a managed address into the fast lookup table device on the switch.

14. The network switch as claimed in claim 10 wherein the control logic on the switch includes:
    a comparison logic for comparing the cluster identification to a plurality of cluster identifications; and
    a decision logic for loading a second cluster identification from the cluster identifications based on the cluster identification not matching a first cluster identification.

15. The network switch as claimed in claim 11 further comprising:
    an input packet buffer for receiving the arriving packet and coupled to the control logic on the switch; wherein:
    the content addressable memory on the switch for generating a matching entry address to the fast lookup table device on the switch with the matching entry address based on the matching cluster identification; and
    the input packet buffer coupled to the fast lookup table device on the switch for providing the member identification associated with the matching cluster identification.

16. The network switch as claimed in claim 15 further comprising:
    an input packet buffer for receiving the arriving packet having an information packet and coupled to the control logic on the switch; and
    a timing circuit coupled to the fast lookup table device on the switch and the slow lookup table on the switch for transmitting the information packet with the selected port identification.

17. The network switch as claimed in claim 13 further comprising:
   an input packet buffer for receiving the arriving packet and coupled to the control logic on the switch; and
   a target address logic between the input packet buffer and the slow lookup table on the switch for providing an address to the slow lookup table.

18. The network switch as claimed in claim 15 is within a cluster.

19. The network switch as claimed in claim 10 further comprising a multiplexer for selecting the selected port identification from the fast lookup table device on the switch or the slow lookup table on the switch.

* * * * *

UNITED STATES PATENT AND TRADEMARK OFFICE
CERTIFICATE OF CORRECTION

PATENT NO. : 8,125,991 B1
APPLICATION NO. : 11/831890
DATED : February 28, 2012
INVENTOR(S) : Michael Schlansker et al.

It is certified that error appears in the above-identified patent and that said Letters Patent is hereby corrected as shown below:

In the Claims

In column 9, line 1, in Claim 17, delete "claim 13" and insert -- claim 15 --, therefor.

Signed and Sealed this
Third Day of September, 2013

Teresa Stanek Rea
*Acting Director of the United States Patent and Trademark Office*